Nov. 16, 1926.          J. F. KEY ET AL          1,607,353
COUPLING
Filed Jan. 30, 1922
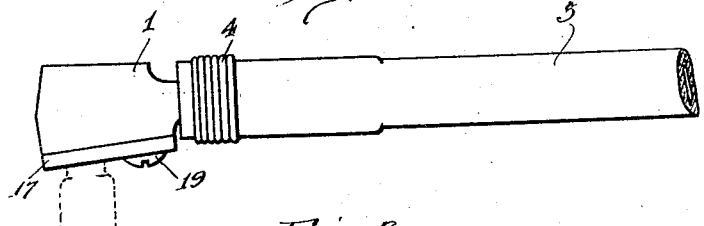
Fig. 1
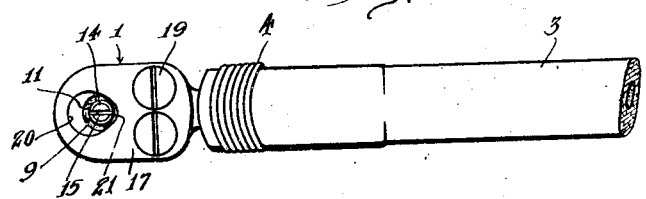
Fig. 2
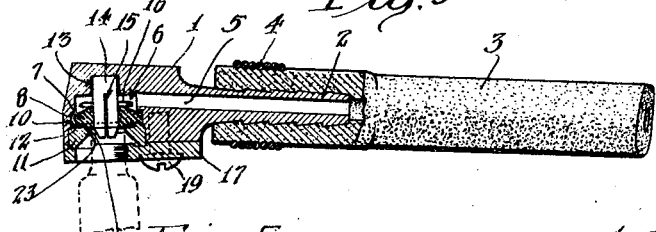
Fig. 3
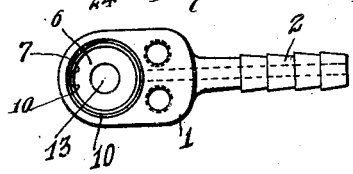
Fig. 5
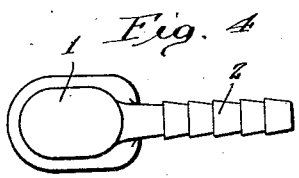
Fig. 4
Fig. 6
Fig. 7
Fig. 8
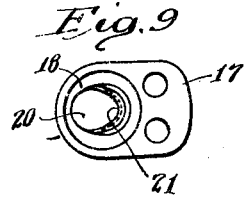
Fig. 9
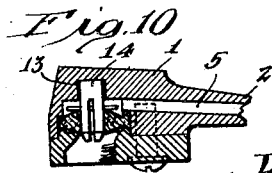
Fig. 10
Inventor
James F. Key
Eugene Holy.
By Lyon & Lyon, attys.

Patented Nov. 16, 1926.

1,607,353

UNITED STATES PATENT OFFICE.

JAMES F. KEY, OF SIERRA MADRE, AND EUGENE HOLY, OF LOS ANGELES, CALIFORNIA, ASSIGNORS TO FIRST TRUST AND SAVINGS BANK OF PASADENA, TRUSTEE.

COUPLING.

Application filed January 30, 1922. Serial No. 532,832.

This invention relates to improvements in air hose couplings such as are employed for temporarily connecting an air hose to the inflating nipple of an automobile tire. It relates particularly to that type of coupling described in Patent No. 1,385,080 issued July 19, 1921, to James F. Key. In the coupling described in that patent, the coupling is constructed with an opening on its under side into which the end of the inflating nipple of the tire was received. In making the connection, it was necessary to apply the coupling to the threaded end of the inflating nipple with the longitudinal axis of the coupling in a tilted or inclined position with respect to the axis of the nipple, and the coupling was then swung down into a substantially horizontal position; when the coupling was swung down in this way, threads formed on the edge of the receiving opening of the coupling interlocked with the threads of the inflating nipple and this operated to lock the coupling temporarily on the inflating nipple. In one embodiment of the invention as shown in that patent, the opening to receive the end of the inflating nipple was formed directly in the body, and the washer which the end of the nipple seats against was inserted through the upper side of the body, being retained by the plug which screwed into the body from above. This embodiment of the invention entails a very considerable number of machine operations which increased the cost of the coupling. In the other embodiment of the invention disclosed in the patent, the opening into the body was made from below and the receiving opening was formed in a bushing which held the washer in place and was in turn held in place by a threaded ferrule which screwed into the under side of the body. In this latter embodiment of the invention, if the retaining ferrule should come loose, it would permit rotation of the inner ferrule or bushing so that the threads of the bushing might accidentally move out of their proper aligning position; and this is important because the end of the air hose carrying the coupling is subjected to rough usage by dropping onto the ground or floor.

It was found in practice also that the person using the coupling would tend naturally to apply it to the inflating nipple in a horizontal position, and therefore it was necessary to "educate" the persons using this coupling in order to assure that they would apply it to the inflating nipple in the tilted or inclined position referred to above.

The general object of this invention is to produce a coupling of this type, but constructed in such a way that it could be applied to the inflating nipple in a substantially horizontal position, after which a slight downward rotation of the coupling would interlock the edge of the receiving opening with the threads of the inflating nipple to hold the coupling in place. It is also an object of this invention to improve the general construction of this type of coupling so as to overcome the difficulties referred to above and to provide a coupling of few parts in which the necessary machine operations would be simplified, and to provide such a coupling in which the serrations or threads to engage the nipple would not be formed directly on the body, and yet in the complete coupling they could not move out of their proper aligning position for effectively engaging the threads of the inflating nipple.

Various other objects and advantages will be more fully apparent from the following description of the accompanying drawings, which form a part of this disclosure, and which illustrate a preferred form of embodiment of the invention.

Of the drawings:

Fig. 1 is an elevation of my improved coupling connected to an air hose and in the first position of engagement over a tire valve stem.

Fig. 2 is a bottom plan view.

Fig. 3 is a longitudinal section, the coupling being in the final position of engagement with the threads of the tire valve stem.

Fig. 4 is a top plan view of the coupling.

Fig. 5 is a bottom plan view of the coupling body with the associated parts removed.

Fig. 6 is a plan view of the washer retaining ring.

Fig. 7 is a plan view of the flexible washer.

Fig. 8 is an enlarged plan view of the valve tripping stud.

Fig. 9 is a plan view showing the inner surface of the retaining plate.

Fig. 10 is a section showing a modified form of structure.

In practicing our invention, we provide an eyeplate which seats upon the under face of the body of the coupling, and this eye-plate is secured to the under side of the body by means such as screws. This eye-plate has an opening through it to align with an air chamber within the coupling and is constructed in such a way as to permit the insertion of the threaded end of the inflating nipple with the axis of the air chamber of the coupling body tilted up into an inclined position with respect to the axis of the inflating nipple. This eye-plate has serrations or threads in the edge of its opening which operate to interlock with the threads of the inflating nipple when the body of the coupling is swung downwardly to a substantially horizontal position; and we provide a center pin which is held by the washer and projects down from it to engage with the stem of the air valve of the inflating nipple to open it when the coupling is applied to the nipple. Mounting the pin in this way gives it a certain mobility at its lower end which is desirable because it facilitates bringing the lower end of the pin into aligning position with the stem of the air valve of the inflating nipple. The eye-plate operates to retain the washer in position, and means is associated with it for this purpose.

We will now describe the invention more in detail, as embodied in the construction set forth in the accompanying specification and drawings.

Referring to the drawings, 1 designates the body of the coupling which has a longitudinal stem or neck 2 adapted to engage in an air hose 3, said hose being clamped thereon by any suitable form of hose clamp such as illustrated at 4.

The body has a longitudinal air passage or duct 5 extending through the neck 2 and communicating with the air hose, said air passage also communicating with a circular recess constituting an air chamber 6 in the body. The wall of the chamber 6 is formed to provide an annular seat 7 for engagement by a washer of compressible material, such as a rubber ring 8 having a central aperture or air port 9. The chamber 6 is further enlarged to form a second annular seat 10 against which engages a keeper ring 11 having a tapered or substantially conical throat aligning with the air port 9 in the washer 8. The inner surface of the ring 11 has an annular rib 12 which embeds into the peripheral portion of the washer 8 and clamps it against the annular seat 7.

The base of the air chamber 6 has a recess 13 into which loosely seats a stud or center pin 14, and this pin extends through the port 9 in the washer 8 and is preferably formed with a tapered terminal end which, when the coupling is engaged over a tire inflating nipple, serves to open the air valve by engaging its stem in the manner usual with this type of device. To maintain communication past the pin 14 it is provided with an air passage which may be a narrow slot 15 extending inwardly to a point well past the inner face of the washer, and to retain the stud or pin in place we provide a split pin 16 extending through the stud immediately transversely adjacent the inner face of the washer.

The keeper or retaining ring 11 is clamped in place by a retaining plate in the form of an eye-plate 17 having a slight countersink 18 engaging over the outer surface of said ring; this plate seats against the under face of the body 1 and is secured to it by screws 19. The plate 17 has a bore or eye-opening 20 vertically aligned with the axis of the washer 8 and stud 14, said opening being preferably extended laterally, and toward the left in Fig. 2, that is to say, in a direction longitudinal of the coupling; and diametrically opposite said elongation the edge of the opening is provided with serrations or screw-threads 21 of a pitch coinciding with that of the screw-threads of a standard tire inflating nipple.

This construction provides a body having an air chamber terminating with a receiving throat elongated laterally in one direction and provided with an adjacent guiding abutment for the nipple and formed with an opposite threaded edge or wall.

In use, the coupling is engaged over the tire valve stem in the position shown in Fig. 1, in such position the stem 2 and hose 3 being substantially in a horizontal plane, or in a plane substantially at right angles to the axis of the stem. By thus applying the coupling, the chamber 6 and associated parts have a tilted or angled position relative to the vertical axis of the inflating nipple so that the coupling is first engaged over the nipple without engaging the threads 21 with the threads of said stem, also the hose 3 serving as a handle for the coupling, is in a position which experience has demonstrated as the one naturally used by most persons in using such a device. In other words if the stem or neck 3 were extended at right angles to the vertical axis of the chamber 6, the coupling would have to be first applied to the valve stem while in a tilted position, as disclosed in the aforesaid Key patent. This required that the public had to be individually instructed in the use of the coupling, whereas with the neck or stem 3 making an acute angle with the axis of the chamber 6 as herein disclosed such individual instruction becomes unnecessary.

During the initial engagement of the coupling upon the nipple, when the coupling is applied in the relation indicated in Fig. 1, and the washer 8 is pressed upon the top edge of the nipple with sufficient force to compress the washer, such compression of the washer being limited by the tapered nose of the stud 14 engaging the end of the nipple, the pin or stud 14 also engaging the valve stem within the nipple to open it and hold it in open position as is usual in this type of coupling.

The coupling is then swung downwardly to the substantially horizontal position shown in Fig. 3, and in this movement the coupling fulcrums on a point 23 on the retaining ring 11, and the threads 21 swing into engagement with the adjacent side of the threaded end of the inflating nipple, and the end of the opposite side of the nipple engaging the threads 21 of the retaining ring 11, and the point 23 acts as an abutment which, as long as the coupling is retained with the chamber 6 aligned with the inflating nipple, will retain the threads 21 of the coupling in engagement with the threads of the nipple.

With the coupling so engaged upon an inflating nipple the inherent elasticity of the washer 8 coupled with the weight of the overhanging coupling stem and of the hose will serve to prevent an upward tilting of the coupling to a releasing position and so long as the effect of this overhanging weight is not destroyed by lifting up the air hose the coupling will automatically be retained upon the inflating nipple.

With the coupling applied to the tire inflating nipple the compressed air is turned into the air hose 3 to inflate the tire, and the air in the chamber 6, acting upon the inner surface of the rubber washer 8, will cause said washer to press outwardly with great force against the end of the inflating nipple in a straight axial direction. This pressure will serve to more firmly lock the coupling on the nipple, for the reason that, with the pressure equally distributed, the pull of the coupling on the stem is directed axially, and as the threaded engagement of the coupling with one side of the nipple prevents movement of the coupling on the one side the tendency of the coupling would be to rock on the threaded plate, using the threads 21 as a fulcrum. This tendency is arrested by the abutment wall 23 engaging against the end of the inflating nipple and the coupling for this reason becomes firmly locked upon the stem. It will therefore be evident that the greater the pressure of the air in the chamber 6, the tighter will the coupling be retained on the tire valve stem.

This automatic function of a coupling of this character is more fully explained in the aforesaid Key patent to which attention is directed for a more detailed description.

The provision of the detachable retaining plate 17 as herein illustrated has several distinct advantages, first, as the coupling body is usually made of relatively soft cast metal such construction enables the plate 17 to be made of a hard metal which will withstand exceptionally hard usage and in which the fine threads 21 will have a long efficient life. Second in a coupling of this character it is necessary that the bore or opening 20 be accurately aligned with the axis of the chamber 6 and that the threads 21 be positioned under the longitudinal horizontal axis of the coupling. In the construction shown the provision of the countersink 18 engaging over the edge of the ring 11 facilitates such accurate alignment, and the fastening of the plate to the body in a definite position insures the accurate positioning of the screw-threads 21 relative to the coupling.

The construction and mounting of the center pin or stud 14 is particularly advantageous in couplings which have a tilting action in their engagement with a valve stem. In this connection it will at once be evident that as the end of the inflating nipple first engages the washer and then has a slight rocking action on the washer as the coupling is tilted; hence it will be understood that the outer end of the stud 14 should be capable of a slight transverse movement or wobble but at the same time, on account of its being mounted in the washer, it will have a tendency to automatically return to true axial alignment. This requirement is met by the present construction wherein the stud 14 is closely engaged by the washer and is thereby yieldingly maintained in axial alignment. The slot 15 in said stud provides a continuous air passage and the pin 16 prevents said stud working outwardly through the washer.

To define the disposition of the stem or neck 2 it may be said to extend outwardly from the body and downwardly relative to the horizontal plane of the body, said horizontal plane being considered the plane of the plate 17 which is positioned at right angles to the vertical axis of the body.

In Fig. 10 we have illustrated a structure of slightly modified form in which the retaining plate bears directly against the elastic washer thereby including in one piece all the functions of the previously described plate 17 and retaining ring 11.

This form for the retaining plate or eye-plate is practicable where it is feasible to construct the plate in quantities as a drop-forging, but the eye-plate of this form is not well adapted to be produced by means of cutting tools. We rather prefer to employ the construction shown in Fig. 3, in which the keeper means is in the form of a ring 11 having a conical bore on its under side, because this form of keeper can be produced readily in large quantities very cheaply, and while the conical face at the right hand side of the ring, as viewed in Fig. 3, may not perform any useful function, it is overhung by the threaded edge of the eye opening. But by reason of the fact that the conical face extends all around the ring, it is immaterial whether the ring rotates or not on its axis;

the threaded part 21 of the key plate, however, is held constantly in a fixed relation and is disposed under and in longitudinal alignment with the longitudinal axis of the coupling body.

While we have illustrated and described a preferred form of embodiment of our invention it is to be understood that the present invention is not to be limited in this regard, as it is susceptible of embodiment in various other forms all coming within the scope of the following claims.

We claim:

1. In an air hose coupling adapted for connection to a tire inflating nipple, a body having an air chamber terminating with a receiving throat elongated laterally in one direction and having an adjacent abutment and formed with an opposite threaded wall, and an elastic member defining the base of said throat, the body having a neck with a duct to communicate with the chamber, said neck extending outwardly from the body in alignment with the elongation of the throat and forming an acute angle with the longitudinal axis of the throat.

2. In an air hose coupling adapted for connection with a valve stem, a body having an air chamber terminating in a receiving throat, an apertured elastic member forming a partition across said chamber to define the base of the receiving throat, a retaining member with screws securing it to the under side of the body in fixed position and retaining the elastic member in place, said retaining member having a bore extended laterally in one direction with its opposite wall provided with screw threads, and means co-operating with the body and retaining member to positively center said retaining member, and thereby determine the position of said screw-threaded wall relative to the body.

3. In an air hose coupling adapted for connection to a tire inflating nipple, a body having an air chamber terminating in a receiving throat, an apertured elastic washer defining the base of said throat, a center pin in said chamber and extending into the aperture of the elastic washer and yieldingly retained thereby in normal axial alignment, said pin having a longitudinal air passage opening communication between the throat and the air chamber and being positioned for its inner end to lie normally against the body to hold said pin against inward movement, and means carried by the pin and engaging the inner face of the elastic member to prevent the pin from working outwardly through the aperture in the elastic member.

4. In an air hose coupling adapted for connection with a tire inflating nipple, a body having an air chamber and an annular seat, an apertured elastic member engaging said seat and forming a partition across said chamber to define the base of a receiving throat, and a retaining plate with means for securing it to the body in a single oriented position, and retaining the elastic member in place, said plate having an opening elongated laterally in one direction with its opposite edge provided with screw-threads.

5. In an air hose coupling adapted for connection with a tire inflating nipple, a body having an air chamber and providing an annular seat, an apertured elastic member engaging said seat and forming a partition across said chamber to define the base of a receiving throat, a retaining ring forming a receiving throat and engaging the elastic member, and a retaining plate clamping the ring against the elastic member and secured to the body in fixed position, said plate having a bore elongated laterally in one direction with its opposite wall provided with screw-threads.

6. In an air hose coupling for connecting air hose to the inflating nipple of a tire, the combination of a body having a neck with an air duct to connect it to the air hose, said body having an air chamber extending into the same from its under side, an annular washer seat within the body, a washer of compressible material within the air chamber held upon said seat from below, an eye-plate formed as a part distinct from the body seating upon the under face of the body, a plurality of screws for securing the same to the under side of the body and operating to hold the eye-plate in a definitely aligned position, said eye-plate having an opening therethrough aligning with the air chamber constructed to permit the insertion of the threaded end of the inflating nipple with the axis of the air chamber tilted up into an inclined position with respect to the axis of the inflating nipple, said eye-plate having serrations on the edge of its opening operating to interlock with the threads of the inflating nipple when the body is swung downwardly, and thereby hold the coupling on the inflating nipple, said eye-plate operating to retain the washer in the air chamber and against the said washer seat, and a center pin projecting down from the washer to engage the stem of the air-valve of the inflating nipple to open the same when the coupling is applied to the nipple, said pin having an air passage therethrough to open communication from the air hose to the nipple.

7. In an air hose coupling for connecting air hose to the inflating nipple of a tire, the combination of a body having a neck with an air duct to connect it to the air hose, said body having an air chamber extending into the same from its under side, a washer of compressible material within the air chamber, an eye-plate formed as a part distinct from the body seating upon the under face of the body, a plurality of screws for securing the same to the under side of the body and operating to hold the eye-plate in a definitely aligned position, said eye-plate having an opening therethrough aligning with the air chamber constructed to permit the insertion of the threaded end of the inflating nipple with the axis of the air chamber tilted up into an inclined position with respect to the axis of the inflating nipple, said eye-plate having serrations on the edge of its opening operating to interlock with the threads of the inflating nipple when the body is swung downwardly, and thereby hold the coupling on the inflating nipple, a center-pin projecting down from the washer to engage the stem of the air valve of the inflating nipple to open the same when the coupling is applied to the nipple, and having an air passage therethrough to open communication from the air hose to the nipple, and keeper means associated with the eye-plate to engage the washer and retain the same upon said washer seat.

8. In an air hose coupling for connecting air hose to the inflating nipple of a tire, the combination of a body having a neck with an air duct to connect it to the air hose, said body having an air chamber extending into the same from its under side, a washer of compressible material within the air chamber, an eye-plate seating upon the under face of the body, means for securing the same to the under side of the body, said eye-plate having an opening therethrough aligning with the air chamber constructed to permit the insertion of the threaded end of the inflating nipple with the axis of the air chamber tilted up into an inclined position with respect to the axis of the inflating nipple, said eye-plate having serrations on the edge of its opening operating to interlock with the threads of the inflating nipple when the body is swung downwardly, and thereby hold the coupling on the inflating nipple, a center-pin projecting down through the washer to engage the stem of the air valve of the inflating nipple to open the same when the coupling is applied to the nipple, and having an air passage therethrough to open communication from the air hose to the nipple, and a keeper-ring between the eye-plate and the washer for retaining the washer.

9. In an air hose coupling for connecting air hose to the inflating nipple of a tire, the combination of a body having a neck with an air duct to connect it to the air hose, said body having an air chamber extending into the same from its under side, a washer of compressible material within the air chamber, an eye-plate seating upon the under face of the body, means for securing the same to the under side of the body, said eye-plate having an opening therethrough aligning with the air chamber constructed to permit the insertion of the threaded end of the inflating nipple with the axis of the air chamber tilted up into an inclined position with respect to the axis of the inflating nipple, said eye-plate having serrations on the edge of its opening operating to interlock with the threads of the inflating nipple when the body is swung downwardly, and thereby hold the coupling on the inflating nipple, a center-pin projecting down through the washer to engage the stem of the air valve of the inflating nipple to open the same when the coupling is applied to the nipple, and having an air passage therethrough to open communication from the air hose to the nipple, and a keeper-ring between the eye-plate and the washer for retaining the washer, said keeper-ring having a substantially conical guide face on its under side for guiding the inflating nipple into position in the coupling.

10. In an air hose coupling for connecting air hose to the inflating nipple of a tire, the combination of a body having a neck with an air duct to connect to the air hose, said body having an air chamber extending into the same from its under side, the axis of said neck inclining downwardly with respect to the horizontal line when the axis of the air chamber is in a vertical position, said coupling having an opening on its under side for guiding the inflating nipple of the tire into the air chamber and having means within the air chamber for opening communication through the neck to the inflating nipple, said opening having serrations substantially in alignment with the vertical plane passing through said neck, constructed to engage and interlock with the threaded extremity of the inflating nipple.

Signed at Los Angeles, California, this 24th day of January, 1922.

JAMES F. KEY.
EUGENE HOLY.